United States Patent
Valdez

[11] Patent Number: 6,085,611
[45] Date of Patent: Jul. 11, 2000

[54] BICYCLE BRAKE CABLE SYSTEM

[75] Inventor: Robert Valdez, Carson, Calif.

[73] Assignee: Bear Corporation, Cerritos, Calif.

[21] Appl. No.: 09/241,109

[22] Filed: Feb. 1, 1999

[51] Int. Cl.[7] .............................. F16C 1/10; B62L 1/00; B62L 1/12
[52] U.S. Cl. ...................... 74/501.6; 74/502.2; 74/502.4
[58] Field of Search ................... 74/489, 501.6, 74/500.5, 502.4, 502.2, 502.5; 403/164, 165

[56] References Cited

U.S. PATENT DOCUMENTS

| | | | |
|---|---|---|---|
| 2,183,791 | 12/1939 | Dunn | 403/165 |
| 2,393,203 | 1/1946 | Tarbell et al. | 403/165 |
| 4,066,147 | 1/1978 | Toyomoto | 74/489 |
| 4,195,798 | 4/1980 | Costantino et al. | 403/165 |
| 4,480,720 | 11/1984 | Shimano | 74/502.2 |
| 4,624,350 | 11/1986 | Akashi | 74/489 |
| 4,644,816 | 2/1987 | Cockburn | 74/502.2 |
| 4,653,613 | 3/1987 | Blancas | 74/489 |
| 4,653,768 | 3/1987 | Keys et al. | 280/279 |
| 4,704,044 | 11/1987 | Yoshigai | 403/165 |
| 4,862,999 | 9/1989 | Rakover | 74/489 |
| 4,914,971 | 4/1990 | Hinkens et al. | 74/502.2 |
| 5,138,898 | 8/1992 | Pospisil et al. | 74/500.5 |
| 5,279,179 | 1/1994 | Yoshigai | 74/500.5 |
| 5,287,765 | 2/1994 | Scura | 74/489 |
| 5,540,304 | 7/1996 | Hawkins et al. | 74/501.6 |
| 5,791,671 | 8/1998 | Tang et al. | 280/264 |
| 5,829,314 | 11/1998 | Scura | 74/500.5 |
| 5,845,539 | 12/1998 | Huang | 74/489 |

FOREIGN PATENT DOCUMENTS 084322 10/1975 Taiwan .

*Primary Examiner*—David A. Bucci
*Assistant Examiner*—Chong H. Kim
*Attorney, Agent, or Firm*—Charles H. Thomas

[57] ABSTRACT

A bicycle brake cable system has a brake cable coupling arrangement in which a plurality of branches are provided from a single brake lever force application lug. Splitting of the brake cable is performed within the structure of a brake barrel adjuster. The barrel adjuster is provided with a cylindrical cavity that receives a rotatable coupler therewithin. The interface ends of the force transmission cable segments are terminated in the coupler, which is free to rotate relative to the barrel adjuster. As a consequence, the barrel adjuster may be threadably advanced to either increase or decrease brake tension by rotation relative to its threaded connection to the brake lever assembly body. By providing a coupler that is rotatable relative to the barrel adjuster, the barrel adjuster can be rotated in both directions to increase or reduce brake tension. The relative rotation between the coupler and the threaded nipple of the barrel adjuster allows the force transmission segments of the brake cable to remain stationary relative to the handlebars, while still permitting tension adjustment on the brake cable.

20 Claims, 9 Drawing Sheets

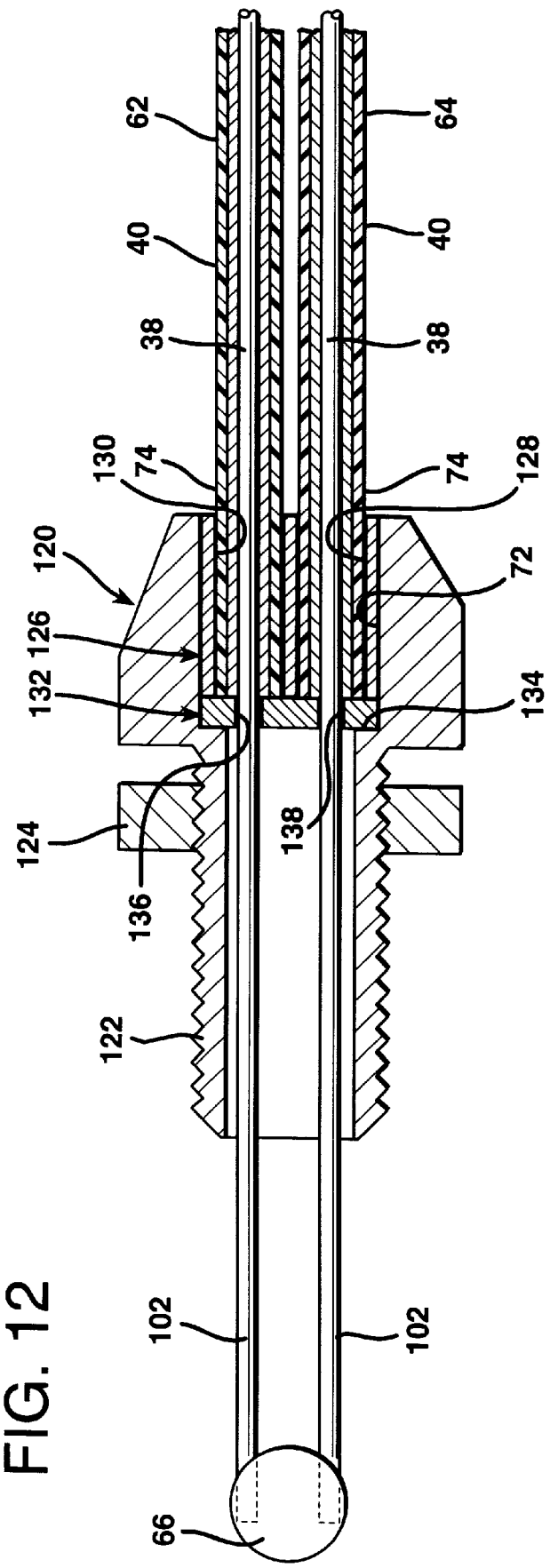

BICYCLE BRAKE CABLE SYSTEM

BACKGROUND OF THE INVENTION

1. Field of the Invention

The present invention relates to a brake cable system in which a bicycle brake cable is split from a single force application lug to a plurality of force transmission locations to apply brakes to the wheel of a bicycle. The bicycle brake cable system has particular applicability to the segment of the bicycle industry known as the freestyle market.

2. Description of the Prior Art

A conventional bicycle employs a frame upon which the seat, rear wheel, pedals, and drive transmission mechanism are mounted, and a steering assembly rotatably mounted relative to the frame. The major components of a bicycle steering assembly include a front wheel, a front wheel fork, a steering tube, a handlebar stem, and a set of handlebars. The steering assembly can be turned at an angle relative to the frame about an axis of rotation extending along the center of the steering tube of the steering assembly and the center of the head tube of the frame. The steering tube is mounting coaxially within the head tube of the bicycle frame and turns relative thereto on steering bearings interposed therebetween.

A number of years ago a rotatable brake cable coupling system was devised for use on a bicycle which allowed a rider to completely rotate the steering assembly of a bicycle as a unit relative to the bicycle frame on a bicycle having hand brakes. Prior to this time such a manipulation was not possible since the bicycle brake cables extending from the hand brake controls on the handlebars to the brake calipers of the brakes on the front and rear wheels of a bicycle would permit only limited rotation of the steering assembly relative to the frame to an arc of far less than 360 degrees.

However, a rotatable brake cable coupling system allows the front wheel, front wheel fork, steering tube, and handlebars of a bicycle to be rotated together through repeated 360-degree revolutions relative to the bicycle head tube by means of which the steering assembly is mounted to the bicycle frame. This feature allows riders to perform stunts while only the rear wheel of the bicycle is in contact with the riding surface. A bicycle having this capability is known in the industry as a "freestyle" bicycle.

One embodiment of a rotatable brake cable coupling system is described in Patent No. 084,322 issued in the Republic of China (Taiwan). Another rotatable brake cable coupling system is described in U.S. Pat. No. 5,791,671. Both of these systems are sold commercially as the Gyro rotatable brake coupling system by Bear Corporation located at 17101 So. Central Avenue, No. G, Carson, Calif. 90746.

Freestyle bicycle components are designed to be very stiff and strong, and are usually quite heavy as well. This type of construction ensures that they will withstand abuse from impact against cement, steel railings, and very high wooden ramps. Freestyle riders require all of the components of their bicycles, especially the braking system, to be not only reliable, but very responsive. The brake cable systems of freestyle bicycles must be free from inordinate flexing, since this leads to a loss of responsiveness in a braking system.

There are various subdivisions to the freestyle bicycle market. In flatland freestyle, bicycle tricks are performed on flat ground. The riders engage in spinning, balancing, and maneuvering their bicycle and body in innumerable orientations and at varying speeds. The riders try to go from one trick to another without ever touching any part of their body to the ground throughout their entire routines. "Pro-street" freestyling is typically done on a series of ramps that are arranged in several positions on a flat area of concrete. The ramps range from three to ten feet in height and can be adjacent, opposing, or at right angles to each other. On the average, "pro-street" riders do about eighty percent of their tricks in the air. These tricks include 360° turns and flips. Other tricks are performed on steel bars and on the tops of ramps.

"Pro-vert" freestyling is done only on one ramp called a half pipe, which usually has a U-shaped configuration and is about twelve feet wide and eight to ten feet high. The half pipe is normally of a wooden construction. Pro-vert riders perform about ninety percent of their tricks in the air and while balancing on the edge or top of the half pipe. They soar into the air up to ten feet above the top of the ramp where they spin the steel bars, remove their feet from the pedals, or both. At the conclusion of such a trick they reposition their limbs and reenter the ramp to roll up the opposing side to perform another trick.

The form of freestyle riding known as dirt jumping is a mixture of BMX and freestyle riding. Riders perform stunts on a series of dirt jumps. They perform sets of triple jumps at four feet, five feet, and eight feet in height. Dirt jumping riders perform tricks similar to those of pro-street riders, but their landing must be more precise. The series of dirt jumps have steeper transitions than the ramps that pro-street and pro-vert rider use. Dirt jumping riders perform 360° turns in the air, bar spinning, and back flip-type of tricks.

All of these freestyle riding systems require the use of a cable detangler, such as the Gyro rotatable brake coupling system. The proper function and responsiveness of such a cable detangler system is extremely important for the performance of tricks because the rider's safety is at stake.

In applying the bicycle brakes during freestyle tricks, riders must be able to both delicately feather (lightly drag) the brake pads and also fully engage the brake pads, thereby locking up their front or rear wheels from any rotation. This is done while balancing on either the front or rear wheel while on top of a ten-foot ramp or on a flat concrete surface. Freestyle riders must be able to rotate the handlebars or frame in the air without drag or flopping of the rotatable brake coupling system rotor. When dragging or flopping occurs, it is difficult for the rider to predict when and where to reach for the grips or pedals before landing. The reason for this difficulty is that the handlebars may be rotating. If there is a significant amount of dragging or flopping, the rate of rotation of the handlebars will be affected.

There are several factors involved in the lock up of the wheel and the smooth rotation of the handlebars relative to the bicycle frame. One of the most important factors is the cabling system, since this is the direct link from the rider to the brakes. Other variables include brake pad compression and friction coefficients, brake arm deflection, brake lever deflection, and frame and boss stiffness. While most of these other variables have been improved adequately by bicycle manufacturers in recent years, flexing and routing problems of the brake cable system have continued to exist. While attempts have been made to reduce these flexing and routing problems, the systems previously devised have been difficult to adjust, expensive, and bulky. These prior attempts to improve the responsiveness and reduce flexing in brake cable systems have therefore not gained widespread commercial acceptance.

In a conventional rotatable brake coupling system for exerting tension on a brake mechanism at a plurality of force transmission locations, there are a number of functional problems. In all conventional systems a splitter is employed in the brake line at some intermediate location between the brake actuating mechanism on the bicycle handlebar and the separate locations at which force is transmitted to the brakes. In a conventional splitter system the splitter housing from which the branches of the force application segments of the cable extend bend in different ways. This causes flopping, wobbling, and poor adjustability of the rotor unit at which the forces from the branches of the brake cable are applied.

When the splitter is free to move relative to the handlebars and steering tube of the bicycle, brake modulation is lost. That is, energy applied to operate the brake lever is lost in pulling the splitter lug, which in turn pulls the splitter in a lateral direction. Because the splitter is not fixed, fatigue to the cable is created over time by the expenditure of energy just to overcome the friction created by the splitter. This results from the awkward arcs of the two force transmission cable segments where they leave the rotatable brake coupling rotor and are routed toward the brake lever.

Also, the use of a conventional splitter at an intermediate location in the overall length of the cable makes it difficult to route and tie the cable to the bicycle frame bars without causing odd bends in the cable sheath. This has the effect of causing poor braking, poor brake modulation, and flopping.

Different manufacturers have attempted to reduce these problems in freestyle braking systems by offering different sizes of bicycle cables. However, the limited number of sizes offered does not effectively address the needs of the user. Furthermore, post-purchase customization of a bicycle cable in order to make it perform in a way for which it is not designed often negatively affects the braking power. Braking modulation is lose and cable life is shortened. Also, because there are so many cables housing, post-purchase length customization of the cable housing is time consuming and makes brake system adjustment difficult.

Conventional splitters also employ numerous parts. The various interconnections in the splitter housing produce excessive flexure and friction in the cable system. The two-from-one branching in the external design of conventional cable splitting systems forces the sheaths of the force transmission cable segments into unnatural positions in response to brake cable "pull back". The splitter lug must then compensate for the increase in load that is caused by exerting the force at angles that are created by the divergence of the force transmission cable segments from the rotatable brake coupling toward the splitter junction. This results in greater friction, less brake modulation, and eventual cable failure at the brake lever lug.

Conventional splitter designs also involve manufacturing problems. The conventional construction of a splitter involves a housing that has three different sections with six separate ends. Each end in the housing must connect to or interact with a different, specific element. The splitter housing requires the fabrication of two plastic pieces, each of which must be machined or cast, each of which needs paint, and one of which must be threaded. The proper fabrication of the splitter housing is therefore both difficult and expensive.

Also, cable assembly of a conventional splitter is very cumbersome and time consuming. In a conventional cable system for a rotatable brake cable coupling twenty-three separate parts must be assembled together.

SUMMARY OF THE INVENTION

The present invention involves a new and improved bicycle brake cable system for exerting tension on a brake mechanism at a plurality of force transmission locations, such as the ears on opposite sides of a rotor assembly employed in a rotatable brake cable coupling system. The brake cable system of the invention eliminates the conventional splitter assembly required in conventional split cable systems. According to the present invention, and contrary to conventional practice, splitting of the brake cable from a single force application segment into branches involving a pair of force transmission segments is not performed at an intermediate location in the brake line between the brake lever arm and the brake rotor assembly. To the contrary, the splitting mechanism is incorporated into the brake adjustment mechanism that is located at the handbrake control mounted on a handlebar of a bicycle adjacent a handgrip at the extremity thereof.

One important benefit of repositioning the splitter to incorporate it into the handbrake control is the elimination of the outer splitter housing, since this function is performed by the existing internally threaded passageway that accommodates a threaded barrel adjuster in a conventional bicycle brake adjustment system. The incorporation of the cable splitting function into the brake adjustment mechanism thereby eliminates the requirement for a separate splitter assembly.

A further advantage of incorporating the cable splitting mechanism into the brake adjusting mechanism is the provision of a better cable routing and a smoother, more direct path between the rotor and the brake lever. This results in less lateral flexing of the brake line, less loss of energy in the application of the brake, and less friction in the system.

The brake cable system of the invention makes adjustment of the brake less complicated. The requirement for a separate splitter barrel adjuster is eliminated since the existing bicycle brake lever barrel adjuster performs the required adjustment function. All adjustment is performed at the brake lever assembly located on the handlebar, which is usually accessible and which is not free floating. To the contrary, the necessary adjustments are performed on a structure that is firmly mounted upon the bicycle handlebar, which provides a solid, stationary base for the body of the device.

By repositioning the location at which branches of the brake cable diverge from an intermediate position in the brake cable line to a location at the bicycle handlebars, and by solidly mounting the branching mechanism relative to the handlebars, lateral flexing and energy absorption at the branching location is greatly reduced. This improves the life of the brake cable components and also provides a much greater degree of precision control of braking by the bicycle rider. The present invention involves significantly fewer parts in providing a cable that has branches from a single force application mechanism. As a consequence, the bicycle brake cable of the system of invention is less costly to produce, involves less time to assemble, and reduces both friction and flexure in the brake cable line.

The brake cable system of the invention is beneficial in many ways and results in a savings of maintenance time and money, while being adaptable to various applications. More importantly, however, it accommodates the needs of freestyle riders, and in particular optimizes brake responsiveness.

In one broad aspect the present invention may be considered to be an improvement in a bicycle brake cable having a brake lever force application lug, a cable segment connector, and a plurality of force transmission segments joined to the brake lever force application lug at the cable segment connector. According to the improvement of the invention the cable segment connector is located adjacent to the brake lever force application lug, unlike conventional bicycle brake cables. Also, a coupler is provided and is rotatably mounted in the cable segment connector. The force transmission segments of the cable are seated in the coupler and are rotatable together with the coupler relative to the cable segment connector. The force transmission segments are connected to the force application lug at the cable segment connector.

In another broad aspect the invention may be considered to be a bicycle brake cable system for exerting tension on a brake mechanism. The invention is comprised of a brake lever force application lug, a brake lever assembly having a body attachable to a bicycle handlebar and a brake lever rotatably connected to the body and connected to the brake lever force application lug. A plurality of force transmission cable segments are provided. Each force transmission cable segment has an interface end and an opposite force transmission end. A hollow tubular cable segment connector is provided and is mounted on the body of the brake lever assembly. The cable segment connector has opposing force application and force transmission ends and a common axis of alignment extending therebetween toward the brake lever force application lug. A coupler is seated in the cable segment connector at the force transmission end thereof for rotation relative to the cable segment connector about the common axis of alignment. The interface ends of the force transmission cable segments extend into the coupler and are seated therein. The brake lever force application lug is secure to the interface ends of the plurality of force transmission cable segments adjacent the cable segment connector proximate the force application end thereof.

In still another aspect the invention may be considered to be an improvement in a bicycle brake cable system for exerting tension on a brake mechanism at a plurality of force transmission locations. Such a brake cable system employs a single brake lever force application lug with a plurality of force transmission cable segments. Each force transmission cable segment has an interface end and an opposite force transmission end. Each force transmission cable segment also has an inner, flexible, inextensible core element surrounded by an outer, flexible sheath element. The bicycle brake cable system to which the improvement relates also has a hollow brake adjuster.

According to the improvement of the invention, the interface ends of the force transmission cable segments are joined together at the hollow brake adjuster. The invention is further comprised of a rotary coupler into which the outer sheath elements at the interface ends of the force transmission cable segments are secured. The rotary coupler is mounted to rotate freely relative to the hollow brake adjuster. This permits the force transmission cable segments to also rotate freely relative to the hollow brake adjuster. The inextensible central core elements of the force transmission cable segments are anchored to the single brake lever force application lug.

In the preferred embodiments of the invention the attachment of the core elements of the force transmission cable segments is a direct connection to the single brake lever force application lug. This avoids the necessity and complexity of a second, junction lug of the type utilized in conventional bicycle rotary brake cable systems.

The invention may be described with greater clarity and particularity by reference to the accompanying drawings.

DESCRIPTION OF THE DRAWINGS

FIG. 12 is a sectional elevational view of an alternative embodiment to that depicted in FIG. 11.

FIG. 13 is a transverse view illustrating the thrust washer employed in the embodiment of FIG. 12.

DESCRIPTION OF THE EMBODIMENTS

Figure 1:
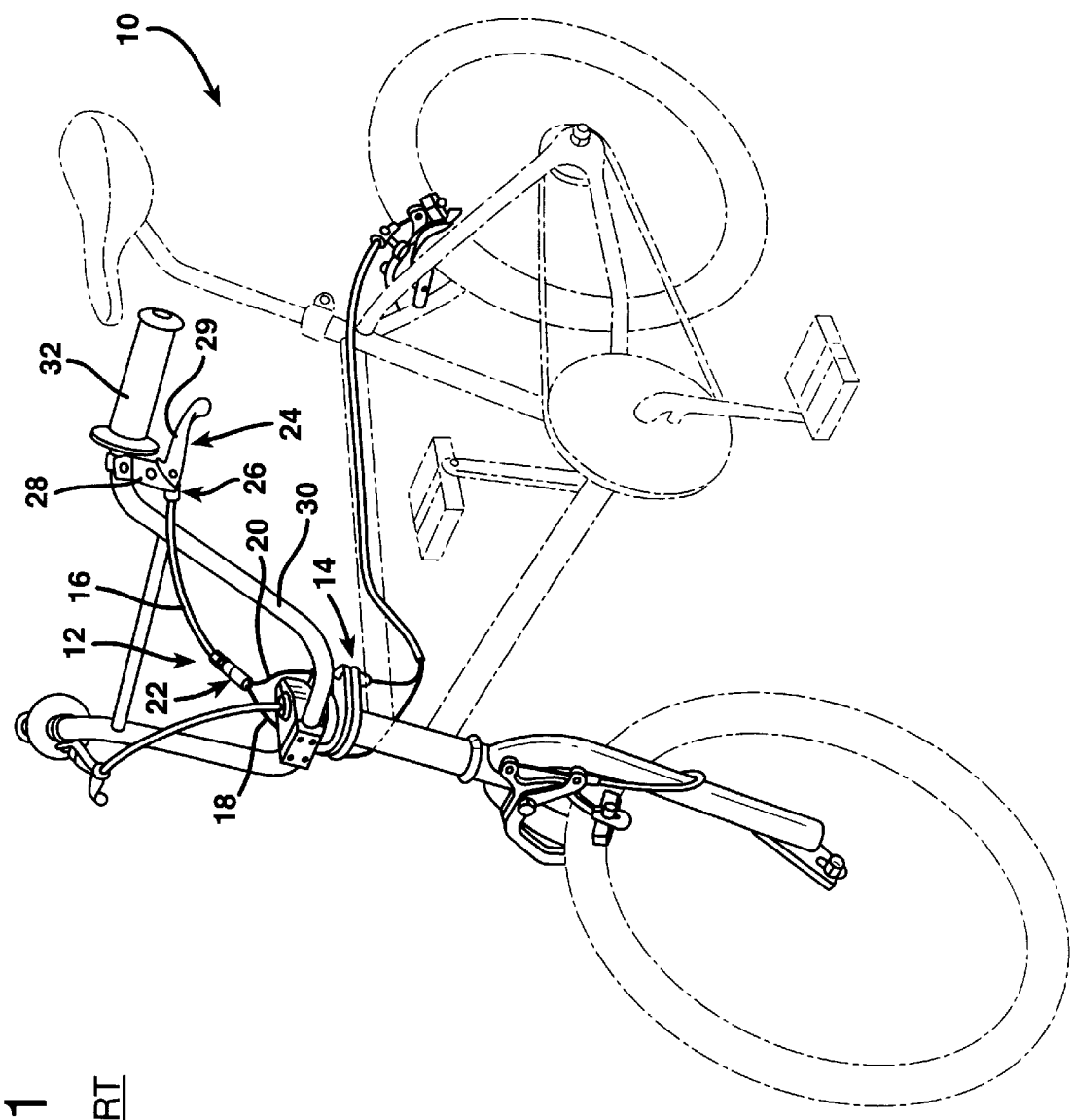
FIG. 1 is a perspective view of a bicycle employing a conventional bicycle rotary brake cable system.

FIG. 1 illustrates a bicycle 10, the standard wheel, sprocket, seat, and frame of which are shown in phantom only as a basis for reference. The bicycle 10 employs a conventional rotary brake cable 12 as employed with a conventional rotatable brake coupling system indicated at 14. The conventional rotary brake cable 12 employs a force application segment 16 to which force transmission segments 18 and 20 are joined at a conventional splitter 22 located at an intermediate location along the overall length of the brake cable 12. In fact, the splitter 22 is typically located rather near the rotatable brake coupling system 14 in conventional systems. The force application end of the force application segment 16 is connected to a bicycle brake lever assembly 24 by means of a conventional barrel adjuster 26. The brake lever assembly 24 includes a brake lever assembly body 28 attached by a mount to the handlebar 30 of the bicycle 10 immediately adjacent one of the handgrips 32 thereof.

Figure 2:
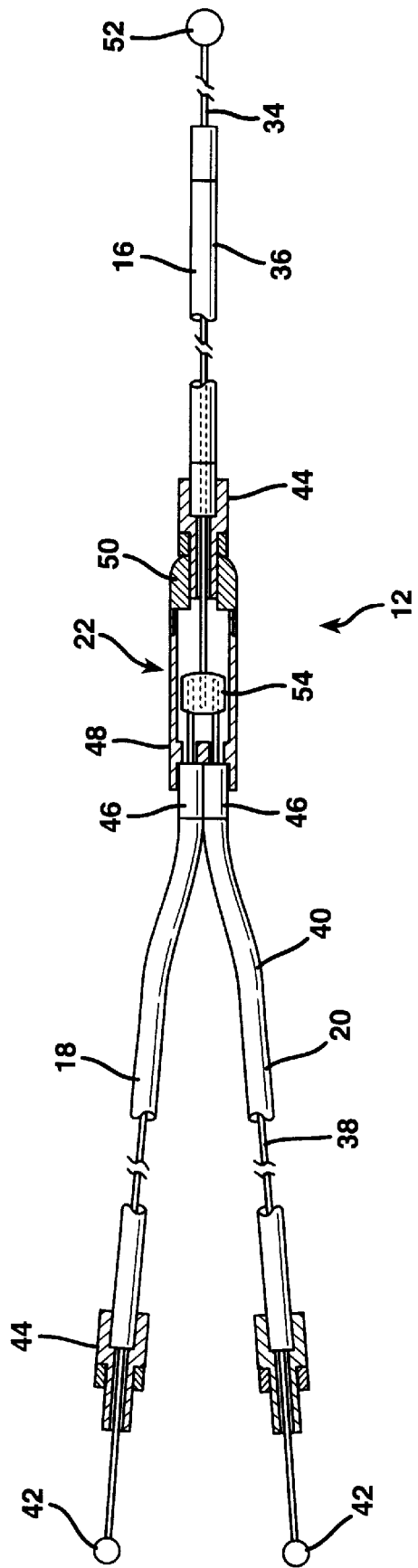
FIG. 2 is a sectional detail illustrating the bicycle brake cable and splitter employed in the system of FIG. 1.

FIG. 2 illustrates in greater detail the structure of the conventional bicycle brake cable system 12 typically employed with a bicycle 10 as illustrated in FIG. 1. As shown in FIG. 2, the force application segment 16 of the brake cable 12 includes an inner, inextensible wire core 34, typically formed of stranded stainless steel wire. The core 34 is surrounded by a flexible, plastic sheath 36 having an annular cross section. The core 34 of the force application segment 16 is movable longitudinally in reciprocal fashion within the sheath 16.

Similarly, each of the force transmission segments 18 and 20 of the brake cable 12 employs an inextensible, flexible, stranded stainless steel wire core 38 surrounded by a plastic sheath 40 within which the core 38 can move in longitudinally reciprocal fashion. Coupling end termination knobs 42 are attached to the wire cores 38 at the force transmission ends of the force transmission cable segments 18 and 20. The sheath elements 40 of the force transmission cable segments 18 and 20 terminate in conventional cable sheath terminations 44 which are engaged with an upper cable stop of the rotor assembly 14 in a conventional manner, as depicted, for example, in U.S. Pat. No. 5,791,671.

The opposite, interface ends of the force transmission cable segments 18 and 20 terminate in annular, metal caps 46 which are seated within sockets defined in a unitary, molded socket member 48 forming one component of the splitter 22. At its other end the splitter 22 has a molded, plastic cap 50 which has a skirt that engages the mating end of the splitter shell 48 and an opposite, internally threaded end that receives a nipple of a conventional cable end termination 44.

The central core element 34 of the force application segment 16 of the brake cable 12 terminates at its force application end in a brake lever force application lug 52, into which the wire core element 34 is securely anchored. The opposite, interface end of the core element 34 passes through the internal bore of the cable end termination 44 that is engaged with the cap 50 and is secured to a junction lug 54 from the direction of the cap 50. Similarly, the interface ends of the core elements 38 of the transmission segments 18 and 20 pass through narrow passageways in the end of the shell 48 and are secured to the junction lug 54 from the opposite direction.

When the brake lever of the brake lever assembly 24 is operated to apply the rear bicycle brakes, a longitudinal force is exerted on the brake lever force application lug 52. This force is transmitted throughout the length of the core element 34 of the force application cable segment 16 to draw the junction lug 54 to the right as viewed in FIG. 2. The longitudinal force on the junction lug 54 is transmitted to the core elements 38 of the force transmission segments 18 and 20, which in turn act through the coupling end termination knobs 42 to lift the rotatable collar of the rotatable brake coupling system 14 upwardly to actuate the rear bicycle brakes. The junction lug 54 is thereby moveable in a longitudinally reciprocating fashion within the cavity formed within the shell 48 of the splitter 22.

The nature of the splitter assembly 22 is such that a number of small, intricate parts are required. The use of a bicycle brake cable 12 employing a conventional splitter assembly 22 as depicted suffers from all of the disadvantages and inadequacies of the prior art previously described.

Figure 3:
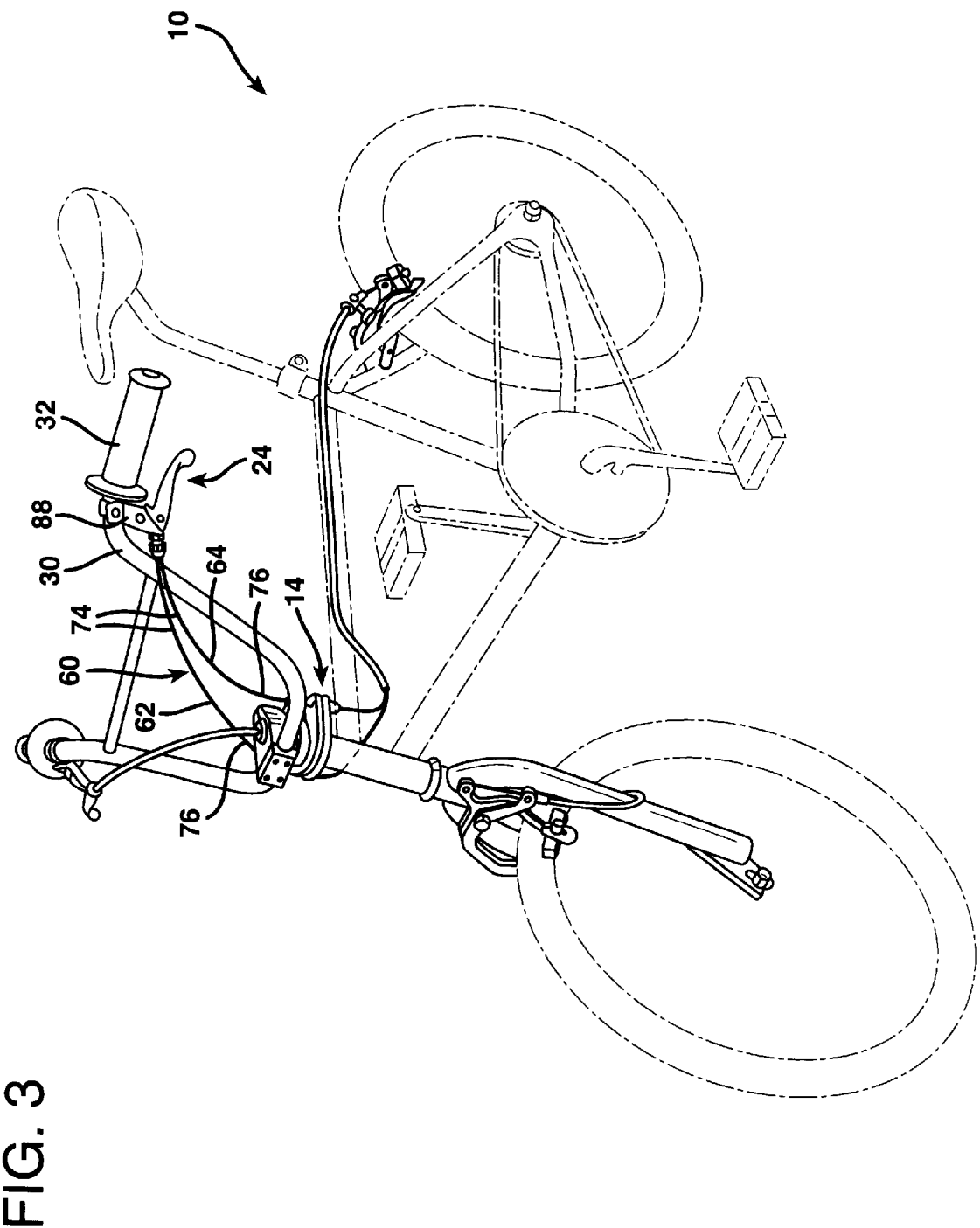
FIG. 3 is a perspective view of a bicycle employing a bicycle brake cable system according to the invention.

FIG. 3 illustrates another bicycle 10 upon which Applicant's novel and advantageous bicycle brake cable 60 is installed in conjunction with a rotatable brake cable coupling system 14 and a brake lever assembly 24 mounted to a bicycle handlebar 30 proximate a handgrip 32 thereof. Although Applicant's bicycle brake cable system 60 terminates in the same rotatable brake coupling system 14 and brake lever assembly 24 as the conventional, prior art brake cable 12, it has significant structural, operational, and manufacturing advantages.

Figure 4:
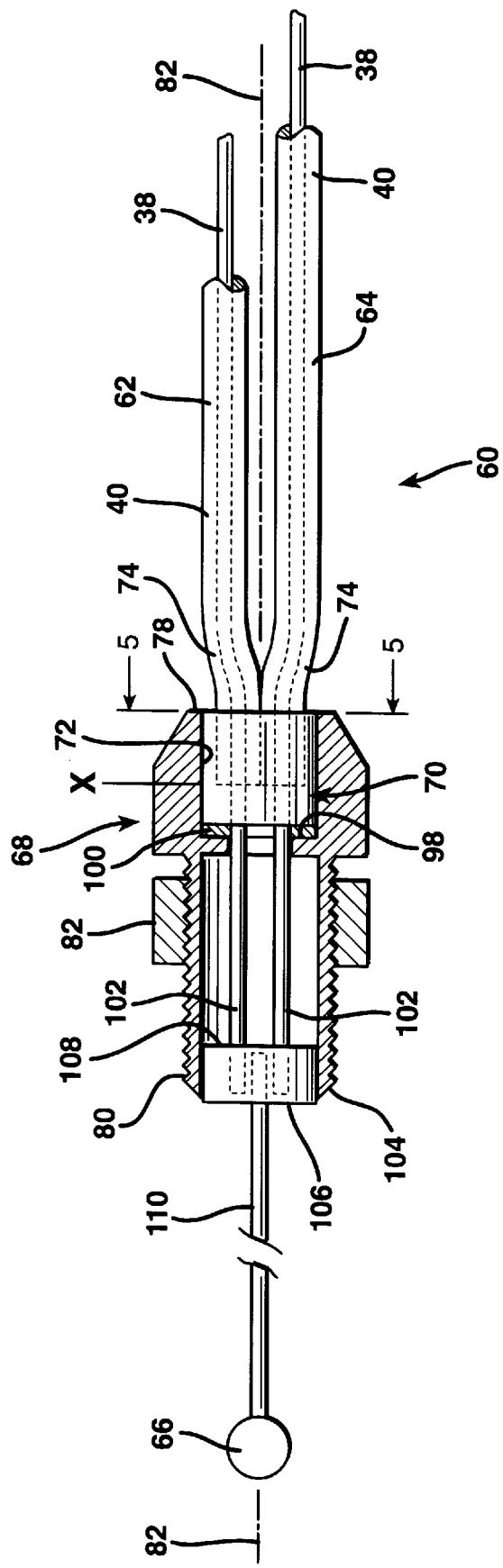
FIG. 4 is a sectional detail illustrating a portion of the bicycle brake cable employed in the system depicted in FIG. 3.
Figure 5:
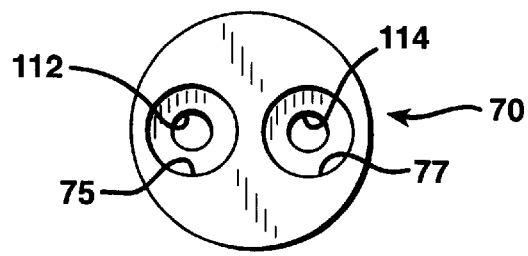
FIG. 5 in an end view of a coupler employed in the bicycle brake cable system of the invention, shown in isolation from the direction indicated at 5—5 in FIG. 4.
Figure 6:
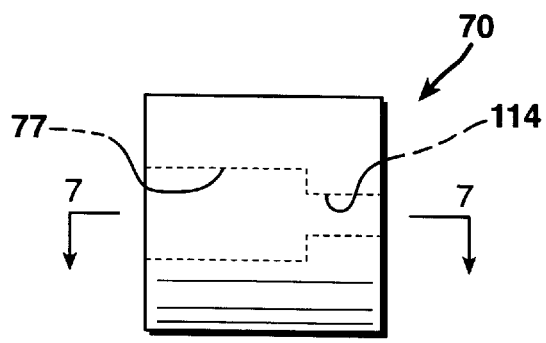
FIG. 6 is a side elevational view of the coupler shown in FIG. 5.
Figure 7:
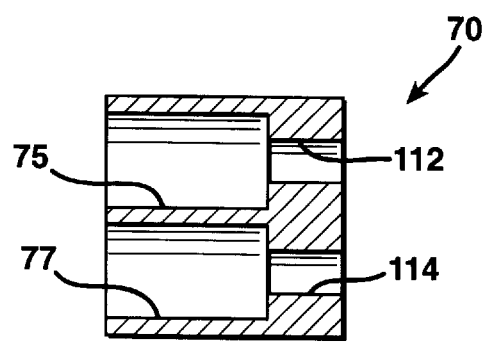
FIG. 7 is a sectional plan view taken along the lines 7—7 of FIG. 6.
Figure 8:
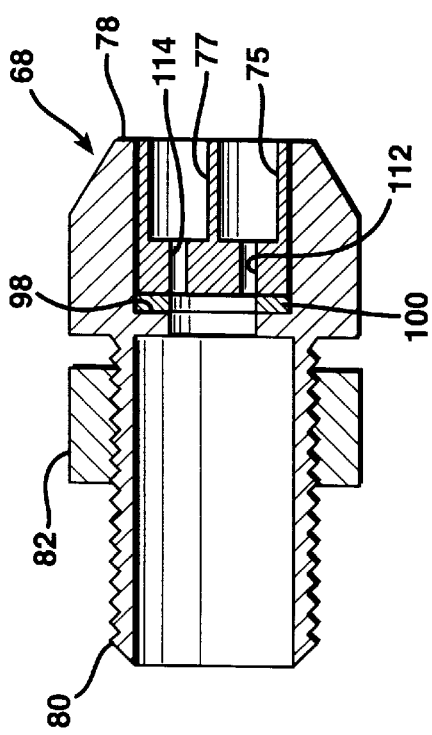
FIG. 8 is a sectional detail showing the coupler and barrel adjuster of the embodiment of the invention shown in FIG. 4 in isolation from the brake cable employed therewith.
Figure 9:
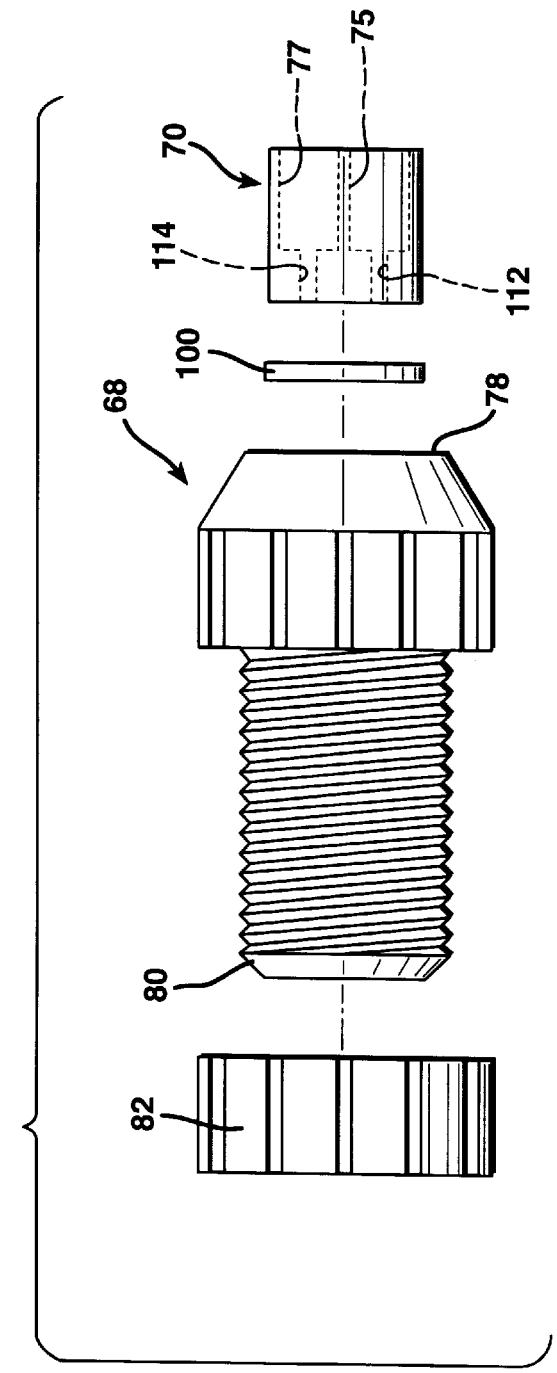
FIG. 9 is an exploded side elevational view of the coupler and barrel adjuster of FIG. 8.

As illustrated in FIG. 3, the bicycle brake cable 60 of the invention has a pair of force transmission segments 62 and 64, which are joined to a single brake lever force application lug 66, as illustrated in FIG. 4. The bicycle brake cable 60 employs a hollow, cable segment connector 68 that performs the function of the brake adjuster 26 shown in FIG. 1, and which also provides a seat for a coupler 70 having a cylindrical outer configuration, as depicted in FIGS. 5–7.

The force transmission segments 62 and 64 of the brake cable 60 are joined to the brake lever force application lug 66 at the cable segment connector 68, which is located adjacent to the force application lug 66 as illustrated in FIG. 4. The coupler 70 is rotatably mounted within a cylindrical cavity 72 in the cable segment connector 68. The force transmission segments 62 and 64 are seated in longitudinally aligned, mutually parallel cylindrical sockets 75 and 77, depicted in FIGS. 5 and 7. The force transmission cable segments 62 and 64 are thereby rotatable together with the coupler 70 and are connected to the force application lug 66 at the cable segment connector 68 in the manner illustrated in FIG. 4.

As shown in that drawing figure, each of the force transmission segments 62 and 64 is comprised of a central, flexible, inextensible core element 38, typically formed of stranded, stainless steel wire, and a surrounding flexible, plastic sheath 40 having an annular cross section. The core elements 38 are movable in longitudinally reciprocal fashion within the sheath elements 40 in a conventional manner.

Each of the pair of force transmission cable segments 62 and 64 has an interface end 74 and an opposite, force transmission end 76. The hollow, tubular cable segment connector 68 is a molded plastic structure having a force transmission end 78 and an opposing force application end 80, which are both oriented along a common axis of alignment 82 extending therebetween, as illustrated in FIG. 4. The cylindrical coupling seating cavity 72 is defined at the force transmission end 78 of the cable segment connector 68. The structure of the cable segment connector 68 is radially enlarged at its force transmission end 78 and includes an outer, knurled surface thereon as illustrated in FIG. 10.

The opposite, force application end 80 of the cable segment connector 68 is formed as an externally threaded nipple having a diameter and pitch that receives a mating, plastic adjustment lock nut 82. The lock nut 82 is threadably engaged on the external thread on the force application end 80 of the cable segment connector 68.

Figure 10:
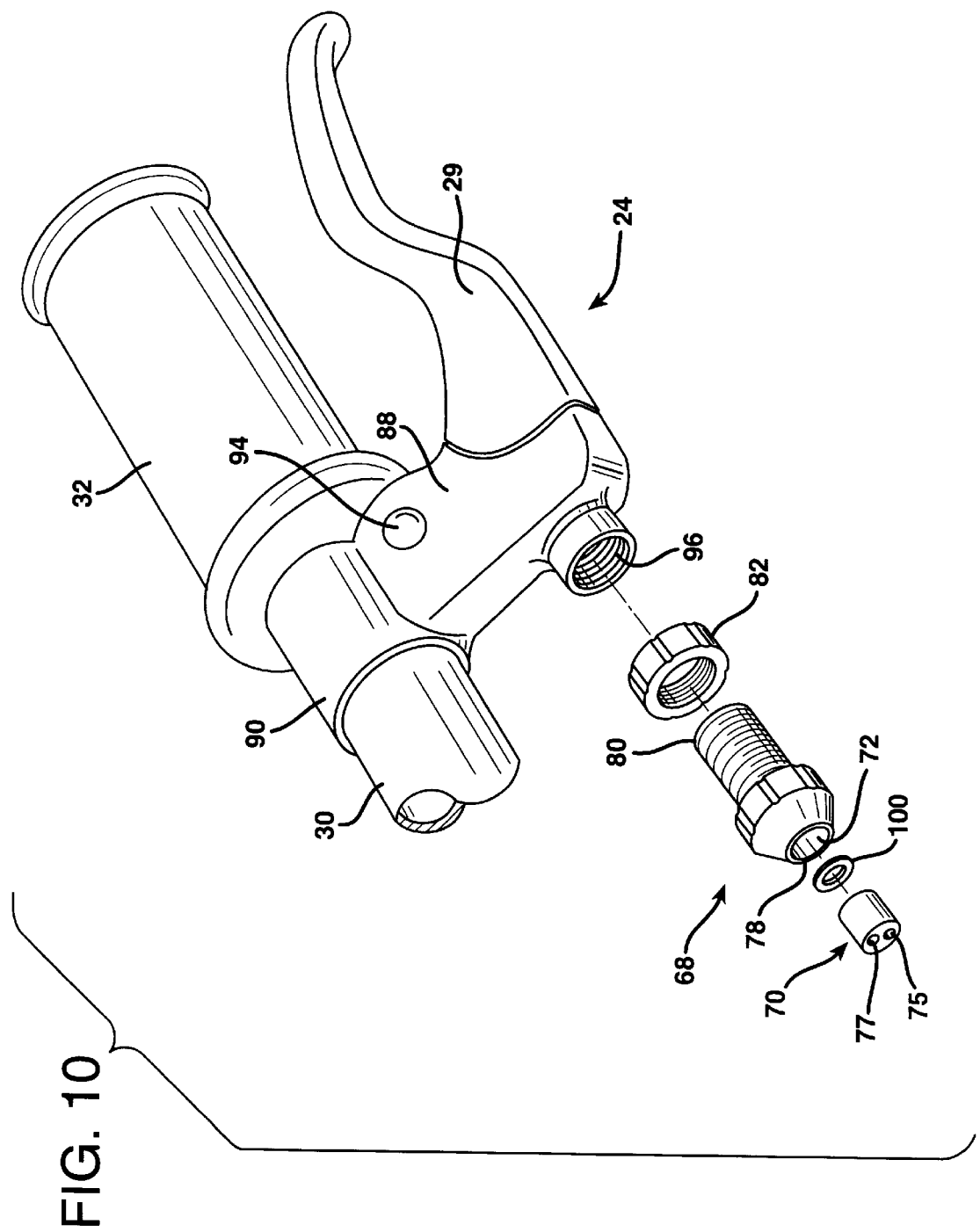
FIG. 10 is an exploded perspective view illustrating the manner of attachment of the coupler and barrel adjuster of the invention to a brake lever assembly that is attached to the handlebar of a bicycle near a handgrip thereof.

As illustrated in FIG. 10, the brake lever assembly 24 includes a hollow body 88 that is secured by a mounting arm 90 to the handlebar 30 adjacent the handgrip 32 at the extremity thereof in a conventional manner. The bicycle brake lever assembly 24 also includes an operating brake lever 29 which is mounted for rotation relative to the brake lever assembly body 88 by an axle 94 that extends through the structure of the brake lever assembly body 88.

The body 88 of the brake lever assembly 24 defines therethrough a cable passageway having an internally threaded entry 96 thereto. The external threads on the barrel at the force application end 80 of the cable segment connector 68 have the same pitch and diameter as the threads of the cable passageway entry 96. The force application end 80 of the cable segment connector 68 is threadably engaged in the passageway entry 96 and can be secured against threaded advancement in either direction by tightening the adjustment lock nut 82 into bearing engagement against the structure of the body 88 at the cable passageway entry 96. The cable segment connector 68 thereby serves the function of a conventional barrel adjuster as well as a cable segment connector according to the invention.

At the transition between the force application end 80 and the force transmission end 78 of the cable segment connector 68 an interior, radially inwardly directed, annular bearing ledge 98 is defined within the structure of the cable segment connector 68. The bearing ledge 98 serves as an abutment against which the coupler 70 bears.

A metal, annular thrust washer 100 is interposed between the coupler 70 and the bearing ledge 98. The thrust washer 100 has an outer diameter that extends nearly to the wall of the cylindrical cavity 72 at the exposed, force transmission end 78 of the cable segment connector 68, and an interior diameter approximately equal to the interior diameter of the bearing ledge 98. When a longitudinal, tensile force is applied to the brake lever force application lug 66, the coupler 70 bears against the bearing ledge 98, but is freely rotatable within the cylindrical cavity 72. This rotation is facilitated by the presence of the thrust washer 100.

The interface ends 102 of the core elements 38 of the force transmission cable segments 62 and 64 extend beyond the ends of the sheath elements 40 within which they are encased, as illustrated in FIG. 4. In the embodiment illustrated in FIG. 4, the ends 102 of the core elements 38 are joined to the brake lever force application lug 66 proximate to the force application end 80 of the cable segment connector 68 by means of a junction lug 104. The junction lug 104 is located within and is reciprocally moveable within the confines of the externally threaded nipple at the force application end 80 of the cable segment connector 68. The brake lever force application lug 66 is located outside of the cable segment connector 68, proximate to the force application end 80 thereof and within the body 88 of the brake lever assembly 24. The junction lug 104 has a force application side 106 and an opposite force transmission side 108 and is shaped as a cylindrical metal slug that is easily moveable along the axis 82 within the structure of the nipple at the force application end 80 of the cable segment connector 68. The ends 102 of the core elements 38 are embedded in and anchored to the force transmission side of the junction lug 104 by conventional means and extend from the force transmission side 108 of the junction lug 104 toward the coupler 70.

The bicycle brake cable 60 also includes an inextensible force application cable segment 110 having opposing ends. The lever end of the inextensible force application segment 110 is anchored to the brake lever force application lug 66. The opposite, interface end of the force application segment 110 is anchored to the junction lug 104, as illustrated in FIG. 4. The inextensible force application cable segment 110 is preferably formed as a short length of stranded stainless steel wire, the opposite ends of which are embedded in the lugs 66 and 104, and are securely and permanently anchored thereto in a conventional manner. The force application segment 110 thereby extends from the force application side 106 of the junction lug 104 and from the force application end 80 of the cable segment connector 68 in a direction opposite the coupler 70.

As best illustrated in FIGS. 4, 5, and 7, the cable segment seating sockets 75 and 77 snugly receive the interface ends 74 of the sheath elements 40 of the force transmission cable segments 62 and 64 therein. The diameter of the sockets 75 and 77 defined in the exposed, force transmission end of the coupler 70 may, for example be about one-quarter inch. At the opposite, force application end of the coupler 70, a pair of cable core ducts 112 and 114 are formed in axial alignment with the cable seating sockets 75 and 77, respectively. The cable core ducts 112 and 114 have the same diameter, which is a diameter smaller than the diameter of the cable seating sockets 75 and 77. Preferably, for example, the diameter of the cable core ducts 112 and 114 is about three thirty-seconds of an inch. In any event, the diameter of the cable core ducts 112 and 114 must be smaller than the diameter of the cable seating sockets 75 and 77 and is large enough to permit the passage of the core elements 38 of the force transmission cable segments 62 and 64 therethrough.

The sheaths 40 of the force transmission segments 62 and 64 are seated in an terminate at the sockets 75 and 77, but the core elements 38 of the cable segments 62 and 64 extend through the sockets 75 and 77 and through the cable core ducts 112 and 114, respectively, where they are connected to the brake lever force application lug 66 through the junction lug 104, as previously described. The diameter of the circular central core element opening through the thrust washier 100 is large enough to allow free passage of the core elements 38 of the force transmission segments 62 and 64.

The embodiment of the brake cable 60 illustrated in FIG. 4 employs a junction lug 104 to which both the force transmission cable segments 62 and 64 and the force application segment 110 are secured from opposing directions. However, even greater advantages may be achieved by constructing the brake cable of the invention so as to avoid the necessity for a junction lug and a force application cable segment altogether.

Figure 11:
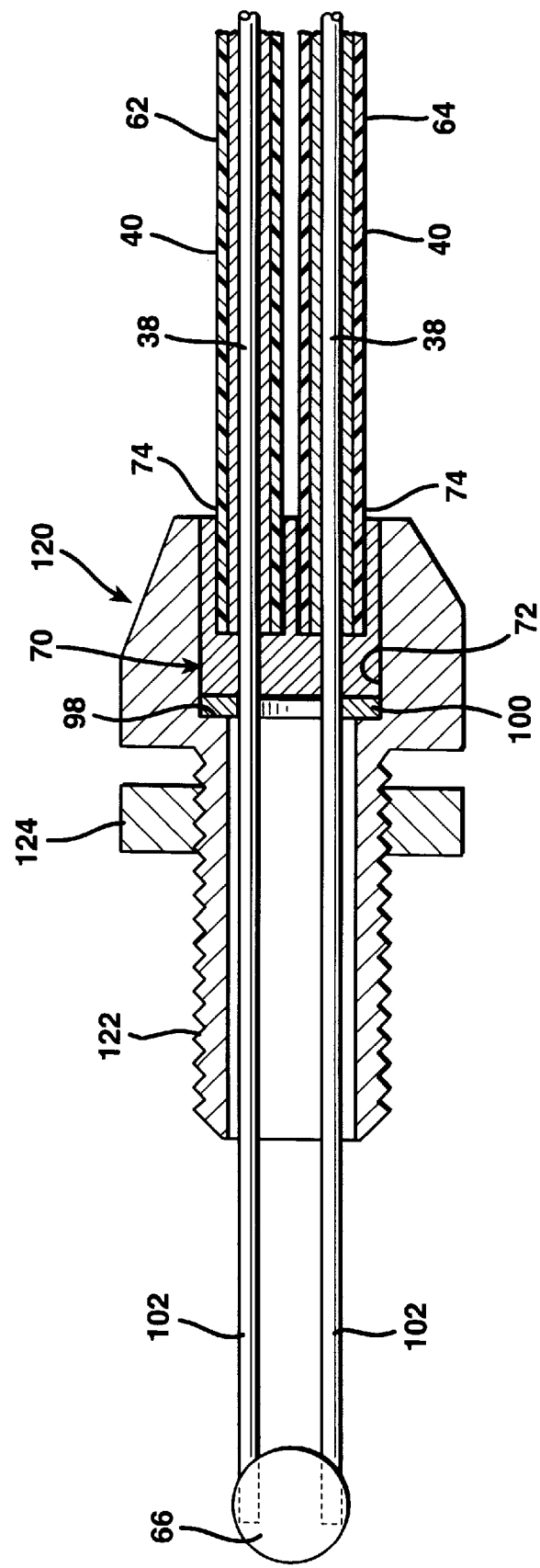
FIG. 11 is a sectional elevational view of a portion of the preferred embodiment of a bicycle brake cable system according to the invention.

FIG. 11 illustrates an embodiment of the invention which employs the same force transmission cable segments 62 and 64, previously described. However, in the embodiment of FIG. 11, the interface ends 102 of the core elements 38 of the force transmission cable segments 62 and 64 are not joined to an intermediate junction lug, but instead extend entirely through the cable segment connector 120 and are joined and anchored directly to the brake lever force application lug 66. The embodiment depicted in FIG. 11 provides not only the advantage of eliminating an intermediate junction lug and the necessity for the additional connections thereto which such a junction lug requires, but has the further advantage of allowing a reduction in the diameter of the nipple forming the force application end 122 of the cable segment connector 120.

Specifically, by eliminating the necessity for a junction lug, the inside diameter of the nipple at the force application end 122 of the cable segment connector 120 can be reduced. This allows a reduction in the outside diameter of the nipple at the end 122 to a pitch diameter no greater than about three-eighths of an inch. This reduction in pitch diameter allows the cable segment connector 120 to be utilized in place of the standard barrel adjuster 26 with any standard brake lever assembly. The standard entrance passageway corresponding to the passageway 96 depicted in FIG. 10 in the conventional, standard brake lever assembly body 28 depicted in FIG. 1 has a nominal pitch diameter of three-eighths of an inch. As a consequence, a bicycle brake cable system according to the invention can be utilized without requiring specially designed brake lever assemblies. Rather, off-the-shelf brake lever assemblies can be utilized and retrofitted by replacing the conventional barrel adjuster 26 employed therein with the combination barrel adjuster and cable segment connector 120 illustrated in FIG. 11. The barrel adjuster lock nut 124 is the same size as a conventional lock nut employed on a conventional barrel adjuster 26.

In the embodiment of FIG. 11, the brake lever force application lug 66 is located externally of the cable segment connector and barrel adjuster 120 proximate the force application end 122 thereof. The interface ends 102 of the core elements 38 of the transmission cable segments 62 and 64 pass entirely through the structure of the cable segment connector and barrel adjuster 120 and beyond, into the cable passageway defined in the body 28 of the conventional brake lever assembly 24. The interface ends 102 of the core elements 38 extend all the way to the end of the brake lever 29 with which the brake lever force application lug 66 is engaged.

Other modifications to the invention are also possible. FIG. 12, for example, illustrates an alternative bicycle brake cable system according to the invention which employs the same barrel adjuster and cable segment connector 120 employed in the embodiment of FIG. 11. As in the embodiment of FIG. 11, the interface ends 102 of the core elements 38 of the force transmission cable segments 62 and 64 pass through the entire structure of the barrel connector 120 and are secured directly to the brake lever force application lug 66.

In the embodiment of FIG. 12, however, the construction of the rotating coupler 126 differs from that of the coupler 70. Specifically, while the coupler 126 has the same cylindrical outer configuration as the coupler 70, it is formed with longitudinally oriented cable segment terminating tubes 128 and 130. The cable segment terminating tubes 128 and 130 extend throughout the entire length of the coupler 126 and snugly receive the cable sheath elements 40 of the force transmission cable segments 62 and 64. A thrust washer 132 is provided and is interposed between the bearing ledge 134 of the barrel adjuster and cable segment connector 120, but is configured differently from the thrust washer 100. Specifically, the thrust washer 132 is not formed as an annular structure with a single, central, axial opening therethrough, but rather is formed as a disc-shaped structure with a pair of small diameter cable core apertures 136 and 138. The apertures 136 and 138 are smaller in diameter than the outer diameter of the sheath elements 40 and are only just large enough to freely admit the passage of the core elements 38 therethrough.

The cable core openings 136 and 138 are defined through the structure of the thrust washer 132 at a radial distance from the center thereof so that they are coaxially aligned with the longitudinally oriented cable segment terminating tubes 128 and 130 of the coupler 126. The cable core openings 136 and 138 are small enough so that the remaining structure of the thrust washer 132 forms an abutment that prevents the movement of the sheath elements 40 in response to a tensile force on the brake lever force application lug 66. The outer periphery of the thrust washer 132, in turn, is held in place by its abutting relationship against the annular bearing ledge 134 defined within the structure of the barrel adjuster and cable segment connector 120.

The sheath elements 40 of the force transmission cable segments 62 and 64 are thereby seated in and terminate at the cable segment terminating tubes 128 and 130. The core elements 38 extend through the cable segment terminating tubes 128 and 130, through the cable core openings 136 and 138, and past the bearing ledge 134. The core elements 38 extend entirely through the threaded nipple at the end 122 of the barrel adjuster and cable segment connector 120, where they are connected to the brake lever force application lug 66. The interface ends 102 of the core elements 38 are thereby connected directly to the brake lever force application lug 66 in the brake operating lever assembly body 28.

Undoubtedly, numerous other variations and modifications of the invention will also become apparent to those familiar with bicycle brake systems. Accordingly, the scope of the invention should not be construed as limited to the specific embodiments of the bicycle brake cable and bicycle brake cable system described herein.

I claim:

1. In a bicycle brake cable having a brake lever force application lug, a cable segment connector having opposing force application and force transmission ends and a common axis of alignment extending therebetween, and a plurality of force transmission segments, each having a central, flexible, inextensible core element and a surrounding sheath element within which said core element is movable in longitudinally reciprocal fashion, joined to said brake lever force application lug at said cable segment connector, the improvement wherein said cable segment connector is located adjacent to said brake lever force application lug and further comprising a coupler mounted in said cable segment connector so that said coupler and said cable segment connector are freely rotatable relative to each other about said common axis of alignment and said sheath elements of said plurality of force transmission segments are seated in said coupler at a fixed axial distance along said common axis of alignment between said force application end and said force transmission end of said cable segment connector, and said force transmission segments are rotatable relative to said cable segment connector together with said coupler and said core elements of said plurality of force transmission segments are all connected to said force application lug at said cable segment connector.

2. A bicycle cable according to claim 1 wherein said coupler is formed with an exposed end that defines cylindrical, longitudinally oriented cable segment seating sockets that snugly receive said sheath elements of said force transmission segments therein and an opposite end that defines longitudinally oriented cable core ducts therewithin which are coaxially aligned with said cable seating sockets and which are of a diameter smaller than the diameter of said cable seating sockets and large enough to permit the passage of said core elements therethrough, whereby said sheaths of said force transmission segments are seated in and terminate at said sockets and said core elements extend through said sockets and through said cable core ducts where said core elements are connected to said brake lever force application lug.

3. A bicycle brake cable according to claim 2 wherein said cable segment connector has a force application end and an opposite force transmission end and said brake lever force application lug is located externally of said cable segment connector proximate said force application end thereof, and said core elements of said force transmission segments are joined directly to said brake lever force application lug.

4. A bicycle brake cable according to claim 2 wherein said cable segment connector is a tubular, hollow structure having a force application end and an opposite force transmission end and having a bearing ledge therewithin located between said force application end of said cable segment connector and said force transmission end of said cable segment connector, and said opposite end of said coupler resides within said cable segment connector and bears against said bearing ledge thereof.

5. A bicycle brake cable according to claim 4 further comprising a thrust washer interposed between said opposite end of said coupler and said bearing ledge.

6. A bicycle brake cable according to claim 5 wherein said thrust washer has an annular configuration defining a single circular central core element opening through which said core elements of said force transmission segments pass.

7. A bicycle brake cable according to claim 5 wherein said thrust washer has a plurality of core element openings therethrough axially aligned with said cable core ducts in said coupler and through which said core elements of said force transmission segments pass.

8. A bicycle brake cable according to claim 5 further comprising an inextensible force application segment having a lever end anchored to said brake lever force application lug and an opposite interface end, and further comprising a junction lug to which said core elements of said force transmission segments are anchored from the direction of said opposite end of said coupler and to which said interface end of said force application segment is anchored from an opposite direction and said core elements of said force transmission segments and said inextensible force application segment extend from said junction lug in opposite directions from each other.

9. A bicycle brake cable according to claim 8 wherein said junction lug is located within the confines of said cable segment connector.

10. A bicycle brake cable according to claim 1 wherein said coupler is formed with longitudinally oriented cable segment terminating tubes that snugly receive said cable sheath elements of said force transmission cable segments and said cable segment connector is a tubular, hollow structure having a bearing ledge therewithin located between said force application and said force transmission ends of said cable segment connector, and further comprising a thrust washer interposed between said coupler and said bearing ledge and which includes cable core openings defined through said thrust washer and said cable core openings are coaxially aligned with said longitudinally oriented cable segment terminating tubes of said coupler, and said cable core openings are axially aligned with said cable segment terminating tubes and are of a diameter smaller than the diameter of said cable segment terminating tubes and large enough to permit the passage of said core elements therethrough, whereby said sheaths of said force transmission segments are seated in and terminate at said cable segment terminating tubes and said core elements extend through said cable segment terminating tubes and through said cable core openings and extend past said bearing ledge and said core elements are connected to said brake lever force application lug.

11. A bicycle brake cable system for exerting tension on a brake mechanism comprising: a brake lever force application lug, a brake lever assembly having a body attachable to a bicycle handlebar and a brake lever rotatably connected to said body and connected to said brake lever force application lug, a plurality of force transmission cable segments each having an interface end and an opposite force transmission end, and each having a central, flexible, inextensible core element and a surrounding sheath element within which said core element is movable in longitudinally reciprocal fashion, a hollow, tubular cable segment connector mounted on said body of said brake lever assembly and having opposing force application and force transmission ends and a common axis of alignment extending therebetween and toward said brake lever force application lug, a coupler seated in said cable segment connector at said force transmission end of said cable segment connector for rotation relative to said cable segment connector about said common axis of alignment and into which said interface ends of said force transmission cable segments extend and said sheath elements are seated in said coupler at a fixed axial distance along said common axis of alignment between said force application end and said force transmission end of said cable segment connector, and wherein said brake lever force application lug is secured to said core elements at said interface ends of said plurality of force transmission cable segments at said cable segment connector proximate said force application end of said cable segment connector.

12. A bicycle brake cable system according to claim 11 wherein said body of said brake lever assembly defines therethrough a cable passageway having an internally threaded entrance thereto, and wherein the exterior of said cable segment connector is configured as a bicycle brake barrel adjuster having an externally threaded nipple at said force transmission end of said cable segment connector and an adjustment lock nut is engaged on said externally threaded nipple.

13. A bicycle brake cable system according to claim 12 wherein said coupler is formed with an exposed end that defines cylindrical, longitudinally oriented cable segment seating sockets that snugly receive said sheath elements of said force transmission cable segments therein and an opposite end that defines longitudinally oriented cable core ducts therewithin which are coaxially aligned with said cable seating sockets and which are of a diameter smaller than the diameter of said cable seating sockets and large enough to permit the passage of said core elements therethrough, whereby said sheaths of said force transmission cable segments are seated in and terminate at said sockets in said coupler and said core elements extend through said sockets and through said cable core ducts and into said threaded nipple of said cable segment connector and are connected to said brake lever force application lug in said brake operating lever assembly body.

14. A bicycle brake cable system according to claim 13 wherein said cable segment connector has a bearing ledge defined therewithin, and said coupler resides within said cable segment connector at said force transmission end thereof so that said coupler bears against said bearing ledge and said core elements of said force transmission cable segments extend into said barrel adjuster and are joined to said brake lever force application lug proximate said force application end of said cable segment connector.

15. A bicycle brake cable system according to claim 14 further comprising: a junction lug and said core elements of said transmission cable segments are anchored to said junction lug, and an inextensible force application cable segment attached to said brake lever force application lug and to said junction lug and said inextensible force application cable segment extends to said brake lever force application lug from said junction lug at said force application end of said cable segment connector in a direction from said junction lug opposite said core elements of said transmission cable segments.

16. A bicycle brake cable system according to claim 15 wherein said junction lug is located within and is reciprocally movable within said externally threaded nipple.

17. A bicycle brake cable system according to claim 14 further comprising a thrust washer interposed between said coupler and said bearing ledge.

18. A bicycle brake cable system according to claim 14 wherein said brake lever force application lug is located outside of said cable segment connector proximate said force application end thereof and within said body of said brake lever assembly and said threaded nipple of said cable segment connector has a pitch diameter of no greater than about three-eighths of an inch and said core elements of said force transmission cable segments are connected directly to said brake lever force application lug.

19. In a bicycle brake cable system for exerting tension on a brake mechanism at a plurality of force transmission locations and employing a single brake lever force application lug, a plurality of force transmission cable segments each having an interface end and an opposite force transmission end and an inner, flexible inextensible core element surrounded by an outer, flexible sheath element, and a hollow brake adjuster, the improvement wherein said interface ends of said force transmission cable segments are joined together at said hollow brake adjuster, and further comprising a rotary coupler into which said outer sheath elements at said interface ends of said force transmission cable segments are secured, and said rotary coupler is mounted to rotate freely relative to said hollow brake adjuster, thereby permitting said force transmission cable segments to also rotate freely relative to said hollow brake adjuster and said inextensible central core elements of said force transmission cable segments are anchored to said single brake lever force application lug.

20. A bicycle brake cable system according to claim 19 wherein said rotary coupler is formed with an exposed end that defines cylindrical, longitudinally oriented cable segment seating sockets that snugly receive said sheath elements of said force transmission cable segments therein and an opposite end that defines longitudinally oriented cable core ducts therewithin which are coaxially aligned with said cable seating sockets and which are of a diameter smaller than the diameter of said cable seating sockets and large enough to permit the passage of said core elements therethrough, whereby said sheaths of said force transmission cable segments are seated in and terminate at said sockets in said coupler and said core elements extend through said sockets and through said cable core ducts and through said hollow brake adjuster and are connected to said brake lever force application lug, and further comprising an annular bearing ring within said barrel adjuster and a thrust washer interposed between said annular bearing ring and said rotary coupler, whereby said rotary coupler bears against said thrust washer and against said annular bearing ring when braking force is exerted on said brake lever force application lug to draw said brake lever force application lug away from said brake adjuster.

* * * * *